United States Patent
Nehmer et al.

(10) Patent No.: US 7,276,126 B2
(45) Date of Patent: Oct. 2, 2007

(54) PRODUCTION OF ENZYME-RESISTANT STARCH BY EXTRUSION

(75) Inventors: Warren L. Nehmer, Decatur, IL (US); Geoffrey A. R. Nobes, Decatur, IL (US); Walter C. Yackel, Blaine, WA (US)

(73) Assignee: Tate and Lyle Ingredients Americas, Inc., Decatur, IL ( * ) Notice: Subject to any disclaimer, the term of this patent is extended or adjusted under 35 U.S.C. 154(b) by 0 days.

(21) Appl. No.: 11/144,391

(22) Filed: Jun. 3, 2005

(65) Prior Publication Data

US 2006/0272634 A1 Dec. 7, 2006

(51) Int. Cl.
C08B 30/12 (2006.01)

(52) U.S. Cl. .................... 127/71; 127/32; 536/102; 536/106

(58) Field of Classification Search ............. 127/71, 127/32; 536/102, 106
See application file for complete search history.

(56) References Cited

U.S. PATENT DOCUMENTS

| | | | | |
|---|---|---|---|---|
| 2,613,206 | A | 10/1952 | Caldwell | 260/233.5 |
| 2,661,349 | A | 12/1953 | Caldwell et al. | 260/224 |
| 3,729,380 | A | 4/1973 | Sugimoto et al. | 195/31 R |
| 4,619,831 | A | 10/1986 | Sharma | 426/93 |
| 4,626,288 | A | 12/1986 | Trzasko et al. | 106/210 |
| 4,937,091 | A | 6/1990 | Zallie et al. | 426/582 |
| 5,089,171 | A | 2/1992 | Chiu | 252/315.3 |
| 5,139,575 | A | 8/1992 | Matsuda et al. | 127/23 |
| 5,281,276 | A | 1/1994 | Chiu et al. | 127/65 |
| 5,368,878 | A | 11/1994 | Smick et al. | 426/646 |
| 5,372,835 | A | 12/1994 | Little et al. | 426/573 |
| 5,376,399 | A | 12/1994 | Dreese et al. | 426/658 |
| H1394 | H | 1/1995 | Dreese | 426/603 |
| H1395 | H | 1/1995 | Prosser | 426/633 |
| 5,378,286 | A | 1/1995 | Chiou et al. | 127/36 |
| 5,378,491 | A | 1/1995 | Stanley et al. | 426/661 |
| 5,387,426 | A | 2/1995 | Harris et al. | 426/573 |
| 5,395,640 | A | 3/1995 | Harris et al. | 426/573 |
| 5,409,542 | A | 4/1995 | Henley et al. | 127/65 |
| 5,436,019 | A | 7/1995 | Harris et al. | 426/573 |
| 5,472,732 | A | 12/1995 | Ohkuma et al. | 426/658 |
| 5,496,861 | A | 3/1996 | Rouse, 3 et al. | 514/778 |
| 5,593,503 | A | 1/1997 | Shi et al. | 127/71 |
| 5,651,936 | A | 7/1997 | Reed et al. | 420/3 |
| 5,711,986 | A | 1/1998 | Chiu et al. | 426/658 |
| 5,714,600 | A | 2/1998 | McNaught et al. | 536/102 |
| 5,849,090 | A | 12/1998 | Haralampu et al. | 127/65 |
| 5,886,168 | A | 3/1999 | Brumm | 536/103 |
| 5,902,410 | A | 5/1999 | Chiu et al. | 127/71 |
| 5,904,941 | A | 5/1999 | Xu et al. | 426/52 |
| 6,013,299 | A | 1/2000 | Haynes et al. | 426/549 |
| 6,043,229 | A | 3/2000 | Kettlitz et al. | 514/60 |
| 6,054,302 | A | 4/2000 | Shi et al. | 435/95 |
| 6,113,976 | A | 9/2000 | Chiou et al. | 426/661 |
| 6,274,567 | B1 | 8/2001 | Brown et al. | 514/60 |
| 6,299,924 | B1 | 10/2001 | Chiu et al. | 426/573 |
| 6,303,174 | B1 | 10/2001 | McNaught et al. | 426/549 |
| 6,348,452 | B1 | 2/2002 | Brown et al. | 514/60 |
| 6,352,733 | B1 | 3/2002 | Haynes et al. | 426/549 |
| 6,423,364 | B1 | 7/2002 | Altemueller et al. | 426/634 |
| 6,468,355 | B1 | 10/2002 | Thompson et al. | 127/71 |
| 6,528,498 | B2 | 3/2003 | Brown et al. | 514/60 |
| 6,613,373 | B2 | 9/2003 | Haynes et al. | 426/549 |
| 6,623,943 | B2 | 9/2003 | Schmiedel et al. | 435/98 |
| 6,664,389 | B1 | 12/2003 | Shi et al. | 536/102 |
| 6,670,155 | B2 | 12/2003 | Antrim et al. | 435/95 |
| 6,844,172 | B2 | 1/2005 | Bergsma et al. | 435/98 |
| 6,890,571 | B2 | 5/2005 | Shi et al. | 426/28 |
| 6,896,915 | B2 | 5/2005 | Shi et al. | 426/20 |
| 6,929,815 | B2 | 8/2005 | Bengs et al. | 426/578 |
| 6,929,817 | B2 | 8/2005 | Shi et al. | 426/661 |
| 7,081,261 | B2 | 7/2006 | Shi et al. | 426/28 |
| 2002/0054948 | A1 | 5/2002 | McNaught et al. | 426/549 |
| 2002/0162138 | A1 | 10/2002 | Kossmann et al. | 800/284 |
| 2002/0192291 | A1 | 12/2002 | Bergsma et al. | 424/488 |
| 2003/0045504 | A1 | 3/2003 | Brown et al. | 514/60 |
| 2003/0054501 | A1* | 3/2003 | Schmiedel et al. | 435/101 |
| 2003/0134394 | A1 | 7/2003 | Antrim et al. | 435/95 |
| 2003/0215499 | A1 | 11/2003 | Shi et al. | 424/465 |
| 2003/0215561 | A1 | 11/2003 | Shi et al. | 426/661 |
| 2003/0215562 | A1 | 11/2003 | Shi et al. | 426/661 |
| 2003/0219520 | A1 | 11/2003 | Shi et al. | 426/549 |
| 2004/0092732 | A1 | 5/2004 | Antrim et al. | 536/123.13 |
| 2006/0078667 | A1* | 4/2006 | Stanley et al. | 426/615 |

FOREIGN PATENT DOCUMENTS

EP 363741 A2 4/1990

(Continued)

OTHER PUBLICATIONS

Donovan et al., *Cereal Chem.* 60(5):381-387 (1983).
Krueger et al., *Journal of Food Science* 52(3):715-718 (May-Jun. 1987).
Stute, *Starch/Stärke* 44(6):205-214 (1992).
Kobayashi, *Denpun Kagaku* 40(3):285-290 (1993) (English translation attached).

Primary Examiner—David M Brunsman
(74) Attorney, Agent, or Firm—Williams, Morgan & Amerson, P.C.

(57) ABSTRACT

A process for producing alpha-amylase resistant starch comprises extruding a feed starch at a temperature in the range of about 60-220° C., thereby producing a product alpha-amylase resistant starch. The feed starch can be in the form of an aqueous slurry or paste that has a dry solids concentration of at least about 50% by weight. The process optionally can include the additional step of heating the product starch to a temperature of at least about 90° C. in the presence of moisture, to increase further the alpha-amylase resistance of the product.

15 Claims, No Drawings

FOREIGN PATENT DOCUMENTS

| | | | |
|---|---|---|---|
| EP | 486936 A1 | 5/1992 |
| EP | 487000 A1 | 5/1992 |
| EP | 499648 A1 | 8/1992 |
| EP | 529893 A1 | 3/1993 |
| EP | 529894 A1 | 3/1993 |
| EP | 553368 A1 | 8/1993 |
| EP | 688872 A1 | 12/1995 |
| EP | 0 747 397 A2 | 12/1996 |
| EP | 806434 A1 | 11/1997 |
| EP | 1088832 A1 | 4/2001 |
| EP | 1 362 869 | 11/2003 |
| FR | 2 268 473 | 11/1975 |
| JP | 04290809 A | 10/1992 |
| JP | 10080294 A | 3/1998 |
| JP | 10191931 A | 7/1998 |
| JP | 231469 A | 8/2001 |
| WO | WO93/03629 | 3/1993 |
| WO | WO96/08261 | 3/1996 |
| WO | WO00/14249 | 3/2000 |
| WO | WO2005/040223 | 5/2005 |

* cited by examiner

PRODUCTION OF ENZYME-RESISTANT STARCH BY EXTRUSION

BACKGROUND OF THE INVENTION

Starch comprises two polysaccharides: amylose and amylopectin. Amylose is a generally linear polymer of glucose units connected by alpha 1-4 glycosidic linkages. Amylopectin is a branched polymer in which many of the glucose units are connected by alpha 1-4 glycosidic linkages, but some are connected by alpha 1-6 glycosidic linkages.

Alpha-amylase is an enzyme that is present in the human body and which hydrolyzes alpha 1-4 linkages in starch, thus leading to digestion of the starch. In certain situations it is desirable to produce starch that resists hydrolysis by alpha-amylase, for example to decrease the caloric content of the starch, or to increase its dietary fiber content. However, attempts to produce such starch in the past have suffered from one or more problems, such as process complexity and expense.

There is a need for improved processes for making starches that are resistant to alpha-amylase.

SUMMARY OF THE INVENTION

One embodiment of the invention is a process for producing alpha-amylase resistant starch. The process comprises extruding a feed starch at a temperature in the range of about 60-220° C., thereby producing a product starch that is resistant to alpha-amylase.

In some embodiments of the process, the feed starch is a high amylose starch, for example one that comprises at least about 50% by weight amylose, or in some cases at least about 65% by weight amylose. Other starches can be used in the process as well. Examples of suitable starch sources include corn, potato, tapioca, rice, pea, wheat, or a combination of two or more thereof.

In some embodiments, the feed starch is dry starch, and water or an aqueous composition can be added to the extruder to form a slurry or paste therein. In other embodiments, the feed starch is in an aqueous slurry or paste that has a dry solids concentration of at least about 50% by weight, or in some cases, at least about 60% or 70% by weight.

Some embodiments of the process include the additional step of heating the product starch to a temperature of at least about 90° C. in the presence of moisture. In certain embodiments of the process, this heat-moisture treatment step can be performed at a temperature of at least about 120° C., or in some cases at least about 150° C., with a moisture content of about 15-35% by weight. In certain embodiments, the moisture content of the product starch during this step is about 20-25% by weight. In some embodiments of the process, the total dietary fiber content of the product starch is increased to at least about 50% by weight by the heating in the presence of moisture.

DESCRIPTION OF SPECIFIC EMBODIMENTS

One embodiment of the present invention is a process in which alpha-amylase resistant starch is produced by extruding a feed starch at a temperature in the range of about 60-220° C. The term "alpha-amylase resistant starch" is used in this patent to refer to a starch that has a component that is resistant to alpha-amylase. It should be understood that the starch can also have components that are not alpha-amylase resistant.

The feed starch can be a high amylose starch, for example one that comprises at least about 50% by weight amylose, or at least about 65% by weight amylose. Such high amylose starches are commercially available. Alternatively, starches that are not as high in amylose can be used.

The starch used in the process can come from a variety of sources, including starches obtained from dent corn, high amylose ae genetic corn (ae is the name of a genetic mutation commonly known by corn breeders and is short for "amylose extender"), potato, tapioca, rice, pea, and wheat varieties, as well as purified amylose from these starches, and alpha-1,4 glucans produced according to international patent application WO 00/14249, which is incorporated herein by reference. Combinations of two more types of starches can also be used in the present invention.

Chemically modified starches, such as hydroxypropyl starches, starch adipates, acetylated starches, and phosphorylated starches, can also be used in the present invention to produce resistant starch. For example, suitable chemically modified starches include, but are not limited to, crosslinked starches, acetylated and organically esterified starches, hydroxypropylated starches, phosphorylated and inorganically esterified starches, cationic, anionic, nonionic, and zwitterionic starches, and succinate and substituted succinate derivatives of starch. Such modifications are known in the art, for example in Modified Starches: Properties and Uses, Ed. Wurzburg, CRC Press, Inc., Florida (1986). Other suitable modifications and methods are disclosed in U.S. Pat. Nos. 4,626,288, 2,613,206 and 2,661,349, which are incorporated herein by reference.

In one embodiment of the process, the feed starch can be a dry product. "Dry" is this context does not mean that the moisture content is 0%, but that the moisture content is low enough to be regarded as dry in a commercial sense. When the feed is dry starch, water or an aqueous composition can be added to the extruder to form a slurry or paste therein.

In another embodiment of the process, the starch is fed to the extruder while it is in the form of an aqueous slurry or paste that has a dry solids concentration of at least about 50% by weight. In some cases, the dry solids concentration of slurry or paste can be at least about 60% by weight, or at least about 70% by weight. The use of such a high solids concentration enhances rapid crystallization of resistant starch crystallites.

The water used in the feed starch and/or added to the extruder can optionally comprise one or more other substances, such as lower alkanols (e.g., alkanols having 1-6 carbon atoms) or salts. The pH can vary from about 3.5 to about 8.5.

In general, extrusion apparatus is well suited to handle high-viscosity, high-solids compositions. Specific examples include single-screw and twin-screw extruders. Such extrusion apparatus is commercially available.

In some embodiments of the process, the temperature of the feed starch during extrusion is in the range of about 70-145° C. It should be understood that the temperature of the starch need not remain constant during extrusion. For example, the extrusion apparatus can comprise more than one zone, and each zone can be held at a different temperature, although preferably the temperature of each zone is within the broad ranges stated herein.

The product starch produced by the process will in many cases have a total dietary fiber (TDF) content of at least about 30% by weight. This can be increased by the additional step of heating the product starch to a temperature of at least about 90° C. in the presence of moisture. The temperature of this heat-moisture treatment step optionally can be at least about 120° C., or in some cases at least about 150° C. The moisture content during this step can be about 15-35% by weight, or in some cases about 20-25% by weight. In order to achieve the desired moisture content during this step, it will be necessary in many cases to add water or an aqueous composition to the product starch. This heat-moisture treatment can increase the TDF of the starch to at least about 50% by weight, and in some cases even higher.

The starch can then be dried. For example, a tray dryer or flash dryer can be used to remove moisture from the wet starch cake, although other drying techniques could be used as well. Persons skilled in this art will understand that a "dry starch product" normally does not have 0% moisture content, but has a low enough moisture content to be considered "dry" for commercial purposes.

The starch product optionally can be milled to reduce its particle size, either before or after heat-moisture treatment. Milling will usually be performed on dried starch.

The starch produced by the process generally is heat-stable and shear-stable, which makes it compatible with high temperature and/or high shear processing. As a result, the starch is well-suited for use in food applications such as baking and frying. In addition, the starch is relatively high in total dietary fiber (TDF).

Resistant starch (RS) has been classified into four different types: Type I results from the starch being physically inaccessible to alpha-amylase (e.g. starch embedded in a protein or fiber matrix, such as found in whole grain); Type II is intact, native starch granules that as uncooked starch has a physical structure that is digestive resistant, but after gelatinization upon cooking is digestible (e.g. potato and banana starch); Type III is starch that has been cooked and gelatinized, or otherwise the native structure has been destroyed, and the starch molecules have re-associated themselves during the processing so that the starch is alpha-amylase resistant after cooking; and Type IV is a result of starch chemical modification which interferes with alpha-amylase digestion. The starch produced by the present process is typically a Type III resistant starch, although it can be Type IV resistant starch when chemically modified starch is used as the starting material.

To a large extent, the native molecular structure of starch can be destroyed in the process of making the resistant starch of this invention. The starch molecules can then re-associate into an ordered structure that results in alpha-amylase resistance.

The word "native" is used commonly in literature as a description of starch. The inventors use the word "native" to mean the properties of starch as it exists in the plant at harvest and upon extraction from the plant with very minimal physical treatment or chemical exposure. For example, wet milling of corn that releases starch from corn kernels requires steeping the kernels in a mild water solution of lactic acid near pH 4 and also containing about 1500 ppm $SO_2$ gas dissolved in the water. This solution penetrates the corn kernels and the $SO_2$ partially reduces proteins in the endosperm protein matrix binding the starch, thereby softening the endosperm so the starch granules can be released upon grinding the kernels. Grinding is actually quite gentle, since the wet milling operation is designed to tear apart the soft kernels, releasing starch without breaking the germ sacs containing oil. The molecular structure, the general morphology and the shape of the starch granules extracted during milling are virtually unchanged from the starch that exists in the kernels prior to milling.

Native starch is often referred to as granular, and word "granular" is often used in literature without definition. Native starch granules generally have a roughly spheroid or ellipsoid shape. They also have native molecular organization including crystallite regions and amorphous regions. The crystallite regions of native starch impart birefringence to it. Several authors refer to native starch structure as "granular structure" or the starch being in a "granular state." Although there is no standard, agreed-upon definition of granular starch, it is the approximate shape of the granule that is the point of reference in this patent application. The inventors of this patent refer to and use the word "granular" in the sense of a spherical or ellipsoidal shaped starch particle. "Granule or granular" is not meant to imply native or uncooked starch or non-cold water swelling starches. It is our desire to distinguish between native, uncooked starches that have intact native crystallinity versus other granular starches that have a similar shape but have lost most or all of their native molecular organization or native crystallite structure. Non-chemically modified and some chemically modified starches that are pasted on hot rolls and scraped off the rolls generally have fragmented and glassy appearing particles of irregular shape, and these starches are not referred to as "granular" by the inventors.

Starch produced by this process can be used as a bulking agent or flour substitute in foods, such as reduced calorie baked goods. The starch is also useful for dietary fiber fortification in foods. Specific examples of foods in which the starch can be used include bread, cakes, cookies, crackers, extruded snacks, soups, frozen desserts, fried foods, pasta products, potato products, rice products, corn products, wheat products, dairy products, nutritional bars, breakfast cereals, and beverages.

Total Dietary Fiber (TDF) is the parameter indicating the degree of alpha-amylase resistance of starch. Suitable procedures for determining TDF include AOAC (Association of Official Analytical Chemists) Method 985.29 and 991.43, which can be carried out using a test kit from Megazyme International Ireland Ltd. The following is a very brief description of the TDF method. Generally, in these procedures starch is dispersed in a MES/TRIS buffered water solution of pH 8.2 in which a high temperature stable alpha-amylase has been added and brought to 95-100° C. for 35 minutes. The sample is cooled to 60° C. and a protease is added and the sample is treated for 30 minutes. Then the solution is changed to pH 4.1-4.8 and glucoamylase is added to the solution. After 30 minutes at 60° C. of enzyme treatment the dietary fiber is precipitated by adding 95% alcohol. The precipitate is collected on a Celite coated crucible and dried overnight. The dry precipitate weight is measured gravimetrically, and the percent TDF is calculated based on the initial starch dry weight, so TDF is a dry basis value.

Various embodiments of the present invention can be understood from the following examples.

EXAMPLE 1

Resistant starch can be prepared from high amylose starch (HS-7 Variety 4200, Honen Starch Co.) using the following procedure:

(1) Measure the moisture content of the high amylose starch.

(2) Place the high amylose starch in the feed hopper of a Leistritz ZSE-18/HP Laboratory Twin Screw Extruder.

(3) Start the extruder and set the zone temperatures as follows:

| Zone 1 | 70° C. |
|---|---|
| Zone 2 | 70° C. |
| Zone 3 | 120° C. |
| Zone 4 | 145° C. |
| Zone 5 | 145° C. |
| Zone 6 | 120° C. |

A suitable screw configuration for the 18 mm diameter, 540 mm length co-rotating twin screw extruder is as follows (with screw element lengths in D's or diameters) moving from the inlet end of the extruder to the outlet die. From the inlet to about 16.5 D location long pitch, conveying screw elements are used with the pitch decreasing slightly as the position of screw elements moves forward. From about 16.5 D to 17.0 D, 30 degree forward kneading blocks are used. From about 17 D to 18 D short pitch, conveying screw elements which transition to 60 degree forward kneading blocks from 18 D to 18.5 D. From the end of the 60 degree kneading block section to the end of the extruder, long pitch, conveying screw elements are used.

(4) Run the screw of the extruder at 200 rpm and feed the high amylose starch at 25 grams/minute while injecting moisture at a rate of 17.6 ml/minute.

(5) Collect and dry the extruded product.

(6) Mill the cooled product to the desired particle size.

(7) Heat and moisture treat the product at 250° F. (121° C.) and 25% moisture for two hours.

Prior to the heat and moisture treatment (step 7), the TDF value of the starch is typically in the range of 30%. After the heat and moisture treatment, the TDF value is typically around 60%.

EXAMPLE 2

Several runs of heat and moisture treatment were performed on extruded starch at varying temperatures and moisture contents. The extruded starch was produced as described in steps (1) through (5) of Example 1, using a starch feed rate of 7.6 grams/minute, a water injection rate of 6.9 ml/minute, and an extrusion temperature of 150° C. The results of the heat-moisture treatment are summarized in Table 1.

TABLE 1

| Beginning TDF % | Moisture content during treatment | Temperature (° C.) during treatment | Time (hours) of treatment | TDF % after treatment |
|---|---|---|---|---|
| 35.24 | 15 | 93 | 1.5 | 30 |
| 35.24 | 15 | 121 | 1.0 | 37 |
| 35.24 | 15 | 121 | 2.0 | 38 |
| 35.24 | 15 | 149 | 1.5 | 59 |
| 35.24 | 25 | 93 | 1.0 | 34 |
| 35.24 | 25 | 93 | 2.0 | 36 |
| 35.24 | 25 | 121 | 1.5 | 60 |
| 35.24 | 25 | 149 | 1.0 | 61 |
| 35.24 | 25 | 149 | 2.0 | 48 |
| 35.24 | 35 | 93 | 1.5 | 43 |
| 35.24 | 35 | 121 | 1.0 | n/a |
| 35.24 | 35 | 121 | 2.0 | 53 |
| 35.24 | 35 | 149 | 1.5 | 36 |

The greatest improvement in TDF appeared to come from treatment at about 20-25% moisture and a temperature of about 150° C. or possibly higher.

The preceding description of specific embodiments of the invention is not intended to be a list of every possible embodiment of the invention. Persons skilled in the art will recognize that other embodiments would be within the scope of the following claims.

What is claimed is:

1. A process for producing alpha-amylase resistant starch, comprising extruding a feed starch at a temperature in the range of about 60-220° C., wherein the feed starch is in an aqueous slurry or paste that has a dry solids concentration of at least about 50% by weight, and wherein the aqueous slurry or paste further comprises at least one alkanol having 1-6 carbon atoms, thereby producing a product alpha-amylase resistant starch.

2. A starch composition produced by the process of claim 1.

3. The composition of claim 2, wherein the feed starch comprises at least about 50% by weight amylose.

4. The composition of claim 2, wherein the feed starch is chemically modified starch.

5. The composition of claim 2, wherein the process further comprises heating the product starch to a temperature of at least about 90° C. in the presence of moisture.

6. The process of claim 1, wherein the feed starch comprises at least about 50% by weight amylose.

7. The process of claim 1, wherein the feed starch is chemically modified starch.

8. The process of claim 1, further comprising heating the product starch to a temperature of at least about 90° C. in the presence of moisture.

9. A process for producing alpha-amylase resistant starch, comprising extruding a feed starch that is dry starch at a temperature in the range of about 60-220° C., thereby producing a product alpha-amylase resistant starch, wherein the feed starch comprises at least about 50% by weight amylose.

10. A process for producing alpha-amylase resistant starch, comprising extruding a feed starch that is dry starch at a temperature in the range of about 60-220° C., thereby producing a product alpha-amylase resistant starch, wherein the feed starch is chemically modified starch.

11. A process for producing alpha-amylase resistant starch, comprising extruding a feed starch at a temperature in the range of about 60-220° C., thereby producing a product alpha-amylase resistant starch, and heating the product starch to a temperature of at least about 90° C. in the presence of moisture, wherein the feed starch is dry starch.

12. A process for producing alpha-amylase resistant starch, comprising extruding a feed starch at a temperature in the range of about 60-220° C., thereby producing a product alpha-amylase resistant starch, and heating the product starch to a temperature of at least about 90° C. in the presence of moisture, wherein the feed starch is in an aqueous slurry or paste that has a dry solids concentration of at least about 50% by weight and the aqueous slurry or paste further comprises at least one alkanol having 1-6 carbon atoms.

13. A starch composition produced by a process for producing alpha-amylase resistant starch comprising extruding a feed starch that is dry starch at a temperature in the range of about 60-220° C., thereby producing a product alpha-amylase resistant starch, wherein the feed starch comprises at least about 50% by weight amylose.

14. A starch composition produced by a process for producing alpha-amylase resistant starch, comprising extruding a feed starch at a temperature in the range of about 60-220° C., thereby producing a product alpha-amylase resistant starch, and heating the product starch to a temperature of at least about 90° C. in the presence of moisture, wherein the feed starch is dry starch.

15. A starch composition produced by a process for producing alpha-amylase resistant starch, comprising extruding a feed starch at a temperature in the range of about 60-220° C., thereby producing a product alpha-amylase resistant starch, and heating the product starch to a temperature of at least about 90° C. in the presence of moisture, wherein the feed starch is in an aqueous slurry or paste that has a dry solids concentration of at least about 50% by weight and the aqueous slurry or paste further comprises at least one alkanol having 1-6 carbon atoms.

* * * * *